United States Patent
Stepura et al.

(10) Patent No.: US 12,534,234 B2
(45) Date of Patent: Jan. 27, 2026

(54) MODULAR UNMANNED AERIAL VEHICLE

(71) Applicant: Oleksandr Stepura, Kyivska oblast (UA)

(72) Inventors: Oleksandr Stepura, Kyivska oblast (UA); Volodymyr Stepura, Kyivska oblast (UA)

(73) Assignee: Oleksandr Stepura, Kyivska oblast (UA)

( * ) Notice: Subject to any disclaimer, the term of this patent is extended or adjusted under 35 U.S.C. 154(b) by 0 days.

(21) Appl. No.: 19/234,695

(22) Filed: Jun. 11, 2025

(65) Prior Publication Data

US 2025/0376276 A1    Dec. 11, 2025

(30) Foreign Application Priority Data

Jun. 11, 2024  (UA) .............................. A 2024 03056

(51) Int. Cl.
| | |
|---|---|
| *B64U 20/40* | (2023.01) |
| *B64C 39/04* | (2006.01) |
| *B64U 20/50* | (2023.01) |
| *B64U 30/14* | (2023.01) |
| *B64U 80/50* | (2023.01) |

(52) U.S. Cl.
CPC .............. *B64U 20/40* (2023.01); *B64C 39/04* (2013.01); *B64U 20/50* (2023.01); *B64U 30/14* (2023.01); *B64U 80/50* (2023.01)

(58) Field of Classification Search
CPC ........ B64U 80/50; B64U 20/40; B64U 20/50; B64U 30/14; B64U 30/40; B64C 39/04; B64C 1/063; B64C 2211/00
See application file for complete search history.

(56) References Cited

U.S. PATENT DOCUMENTS

| | | | |
|---|---|---|---|
| 7,922,115 B2 | 4/2011 | Colgren et al. | |
| 11,292,596 B2* | 4/2022 | Grubb | ..................... B64C 39/04 |
| 11,554,847 B2* | 1/2023 | Stepura | .................. B64U 20/50 |
| 12,129,057 B2* | 10/2024 | Makarchuk | ............ B64U 20/40 |

FOREIGN PATENT DOCUMENTS

| | | | | |
|---|---|---|---|---|
| EP | 3495267 B1 | 9/2020 | | |
| FR | 2967971 A1 * | 6/2012 | ............. | B64C 39/04 |
| RO | 129358 | 4/2014 | | |

* cited by examiner

*Primary Examiner* — Richard Green
(74) *Attorney, Agent, or Firm* — Saliwanchik, Lloyd & Eisenschenk (57) ABSTRACT

A modular UAV comprising a fuselage, wing panels, a stabilizer, and two booms with vertical stabilizer, each of the booms equipped with an adapter. The wing panels are configured so the adapters of the boom are connectable thereto to form a lock connection. A spar passes through the fuselage, and the wing panels include holders for the spar. Ends of the spar comprise adapters formed as tabs. The lock connection is formed by connection of a turn bushing having a transverse notch to a spring-loaded fastener positioned in each of the wing panels, and of each spar adapter to a respective boom adapter that is hook-shaped, while being fixable by an external lever rigidly coupled to the turn bushing. Each wing panel includes a torque pin coupled to a corresponding fuselage hole displaced along a fuselage axis relative to the spar.

7 Claims, 9 Drawing Sheets

MODULAR UNMANNED AERIAL VEHICLE

CROSS-REFERENCE TO RELATED APPLICATION

This application claims priority to Ukrainian Application No. a 2024 03056, filed Jun. 11, 2024, which is hereby incorporated by reference in its entirety.

FIELD OF THE INVENTION

The claimed invention relates to a field of flight technologies and concerns a modular unmanned aerial vehicle (UAV) that is configured to be quickly and easily assembled and disassembled at a mission accomplishment site, i.e., take-off and landing, without use of any auxiliary tools.

PRIOR ART

One of the most important innovations in recent years is represented by UAVs that are widely used both in military field and civil life. Modular foldable UAVs that are characterized by mobility and portability are becoming more popular.

Main advantages of the modular UAVs include quick assembly and disassembly as well as easy transportability in a disassembled state owing to an assemblable structure. However, the modular UAVs possess certain drawbacks. Due to the presence of connecting elements, these vehicles have lower rigidity as compared to monolithic structures, which affects their resistance against loads. Despite general convenience, some modules must be precisely secured and aligned both manually and by means of tools. This affects a speed of assembly and disassembly, and requires attention to details in order to ensure required flight characteristics.

The modular UAVs are characterized by a possibility of individual modules replacement, thereby allowing to reduce maintenance and upgrade costs significantly. For example, if one of the modules is faulty, then it can be quickly replaced without any need to purchase a new vehicle. This also allows to improve aerodynamic properties by replacing or supplementing main details.

A patent U.S. Pat. No. 7,922,115B2 dated Apr. 12, 2011 discloses changing wing area and length, where a UAV comprises a main wing that consists of two or four identical sections, wherein the wing sections are interchangeable from a left side of the aerial vehicle to a right side and vice versa, and wherein each wing section comprises a male connector on a spanwise distal end and a female connector on a spanwise opposite end, and the connectors are configured to connect to either a wing mount or to an adjacent wing section. A drawback of this technical solution is its structural simplicity that does not ensure any reliable connection of the parts to each other. As a result of vibrations that occur during the UAV flight, the sections will shake or even can be disconnected, thereby negatively affecting the aerodynamic properties of the UAV.

A patent application RO129358A0 dated Apr. 30, 2014 discloses a modular UAV that consists of a wing, wing stabilizers, a fuselage, a front module, a rear module, a spar, and a payload. Structural elements, including the payload, are assembled by locking operations without use of special tools, while a disassembly operation requires use of a simple wedge-type device. A drawback of this technical solution is a non-reliability of the connection of the elements despite its structural simplicity. This is caused by vibrations and loads that occur during the flight, which can shake the structure. This results in a displacement of the elements during operation, thereby negatively affecting aerodynamic properties and an overall stability of the aerial vehicle.

Also, a patent EP3495267B1 dated Sep. 16, 2020 discloses a UAV comprising a fuselage, a wing panel that is connected to the fuselage and includes a twin booms with vertical stabilizers that are configured to be removably connected to wing assemblies. The wing assembly includes twin booms with vertical stabilizers assemblies that are arranged on lateral opposite sides of the fuselage, and each boom with vertical stabilizer has a front end that is configured to be mechanically connected to the wing by means of a mechanical fastener that is accessible from outside, and each wing panel comprises at least one boom with vertical stabilizer fastening site that protrudes from an upper surface of the wing assembly and is provided with the hole for a guide peg, the boom fastening site has a wedge-like cross-section if seen from top to bottom, and a rear support of the boom has a pair of flanges that define a wedge-like cavity that is configured to be in a direct physical contact with internal surfaces of the flanges when the mechanical fastener is engaged with a threaded hole. A drawback of this technical solution is a non-reliable and unstable connection of the wings to the fuselage. This is caused by connection spars that are used for the connection, the spars are arranged in each of the wing panels in a form of elongated torque pins. Loads that act on the vehicle and vibrations that occur during the flight result in shaking and even disconnection of the elements, thereby hazarding the flight safety and efficiency of accomplishment of missions.

A patent U.S. Pat. No. 11,554,847B2 dated Jan. 17, 2023 is taken as the closest analog of the invention, where a UAV comprises a wing, a boom with vertical stabilizer, an adapter that is positioned on an end of the boom with vertical stabilizer, and a locking tool that is configured to receive the adapter, the locking tool comprises a first locking part that is connected to the wing and a second locking part that is rotatable relative to the first locking part between a first position and a second position, the locking tool is configured to connect the boom with vertical stabilizer to the wing when the second locking part is in the second position, and to disconnect the boom with vertical stabilizer from the wing when the second locking part is in the first position.

A drawback of this technical solution lies in an insufficient rigidity of the connection between the wing and a fuselage, since the locking is performed by means of torque pins. This affects an overall structural integrity and stability of the aerial vehicle, since the aerial vehicle is influenced by significant aerodynamic loads and vibrations during its flight. The non-reliable lock results in shaking of the connections that, in turn, causes reduction of a control accuracy and flight stability. This configuration may result in disconnection of the wing from the fuselage during the flight that creates a serious danger for accomplishment of missions and preservation of the UAV integrity. These structural drawbacks may significantly limit the reliability and service life of the aerial vehicle, while requiring more frequent maintenance and increasing a risk of emergency situations.

It follows from the prior art that a demand for modular UAVs is rather high, however, the structures of the aerial vehicles possess a number of drawbacks that affect the speed of assembly and disassembly, stability, reliability and efficiency of their use. Therefore, there is a need in creation of a modular UAV.

SUMMARY OF THE INVENTION

Embodiments of the subject invention provide a modular UAV that is quick and easy to assemble and disassemble at a take-off or landing site without use of any auxiliary tools.

An achieved technical effect lies in provision of a modular UAV that is quick and easy to assemble and disassemble at the take-off or landing site without use of any auxiliary tools owing to a simultaneous connection of the UAV main parts, while ensuring structural strength and loads resistance, by means of a rigid connection of the main parts to each other. Also, flight duration and efficiency are further increased owing to changing a wing panels length, while ensuring easy and compact transportation to a deployment site or from the landing site.

Certain embodiments provide a modular UAV that comprises a fuselage, wing panels, a stabilizer, and two booms with vertical stabilizers, each of the booms with vertical stabilizers is equipped with an adapter, and the wing panels are configured so that the adapters of the boom with vertical stabilizer are connectable thereto to form a lock connection.

A spar is passed through the fuselage, and the wing panels are provided with holders for the spar, while each end of the spar is equipped with adapters made as tabs. The lock connection is formed by a simultaneous connection of a turn bushing having a transverse notch and a spring-loaded fastener, the sleeve is positioned in each of the wing panels, to the spar adapter, and to the adapter of the boom with vertical stabilizer that is hook-shaped, while being fixable by an external lever that is rigidly coupled to the turn bushing. Each wing panel is equipped with at least one torque pin that is coupled to a corresponding fuselage hole that is displaced along a fuselage axis relative to the stringer.

The adapters ensure a reliable connection of the boom with vertical stabilizer and the spar to the turn bushing, thereby forming the lock connection. This allows to easily assemble and disassemble the structure in a single movement, thereby ensuring reliable and stable point-to-point connection of the structure elements.

The provision of the spar holder in the wing panels facilitates the connection of its adapters to the turn bushing, thereby ensuring easy creation of the lock connection, while providing precision and reliability of the connection.

Therewith, the simultaneous fastening of the main elements ensures quick and convenient assembly, thereby increasing the efficiency of assembly and disassembly of the UAV.

The spar is the main element that holds the wing panels. However, the torque pins in the wing panels provide an additional fastening, thereby ensuring a precise retention of the wing panels, while avoiding their unwanted fluctuation relative to the fuselage during the flight.

According to an exemplary embodiment, each wing panel comprises a main part and an end part that is equipped with an adapter, and the main part is coupled to the end part by means of the lock connection that is formed by a simultaneous connection of the spring-loaded turn bushing having the transverse notch to the adapter of the end part of the wing panel.

Variability of the end part allows to alter aerodynamic characteristics of the wing panels, thereby allowing to change the flight duration and speed. Also, a change in length of the wing panels allows to increase a maximum payload weight.

According to another exemplary embodiment, a turning angle of the external lever is from 0 to 180 degrees. This configuration ensures reliable fastening of the lock connection without any rolling.

According to another exemplary embodiment, the spar is made as a bar that is movable and fixable as a result of a turn around a symmetry axis within fuselage holders. This configuration of the spar and the fuselage holder ensures a rigid fastening and avoids any vertical displacement of the spar.

According to another possible exemplary embodiment, holders of the booms with vertical stabilizers are provided in the wing panels. The presence of the holders of the booms with vertical stabilizers facilitates the connection of their adapters to the turn bushing, thereby ensuring easy creation of the lock connection, while providing precision and reliability of the connection.

According to another possible exemplary embodiment, the lock connection is arranged in the wing panels internal part.

According to another possible exemplary embodiment, the two booms with vertical stabilizers are connected to the horizontal stabilizer by means of the torque pins.

The lock connection ensures structural strength and load resistance. Therewith, all the UAV elements are reliably connected to each other, however, in order to further increase the structural stability and rigidity, the two booms with vertical stabilizers are connected to the stabilizer by means of the torque pins.

BRIEF DESCRIPTION OF THE DRAWINGS

In order to provide further understanding of the claimed invention and its advantages, the following description offers an explanation of a possible implementation thereof with reference to the figures of the appended drawings, wherein identical reference numerals denote identical parts, and that illustrate the following:

MAIN DESIGNATIONS 1 the UAV,
2 the fuselage,
3 the wing panels,
4 the stabilizer,
5 the boom with vertical stabilizer,
6 the adapter of the boom with vertical stabilizer,
7 the spar,
8 the holder,
9 the spar adapters,
10 the turn bushing,
11 the transverse notch,
12 the spring-loaded fastener,
13 the external lever,
14 a shell,
15 a guide groove,
16 a first recess of the guide groove,
17 a second recess of the guide groove, 18 a retaining ring,
19 the fuselage holder,
20 a holder of the boom with vertical stabilizer,
21 the torque pin,
22 the fuselage hole,
23 the wing panel's internal part,
24 the wing panel lower surface,
25 the torque pins of the stabilizer,
26 slots,
27 the wing panel main part,
28 the wing panel end part,
29 the spring-loaded turn bushing,
30 the transverse notch,
31 the adapter of the wing panel end part,
32 a plug,
33 a holder of the wing panel main part,
34 an external lever,
35 a torque pin of the wing panel end part,
36 a holder of the wing panel main part.

The illustrative materials that explain the claimed invention and the disclosed specific exemplary embodiments do not limit the claimed scope of rights in any way, rather they only explain details of the invention.

IMPLEMENTATION OF THE INVENTION

Figure 1:
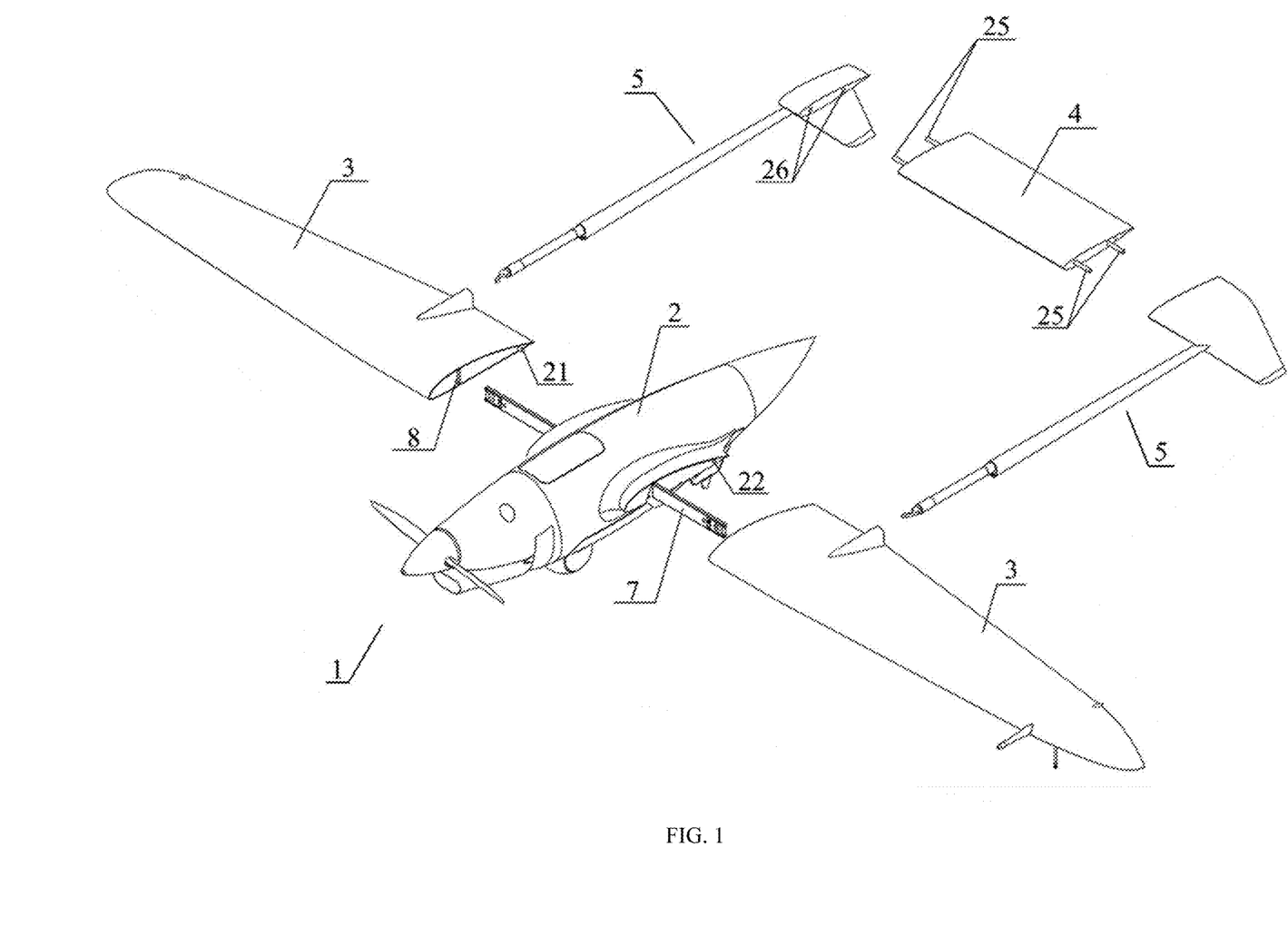
FIG. 1 illustrates an exploded view of the UAV.

A modular UAV (1) comprises a fuselage (2), wing panels (3), a stabilizer (4) and two booms with vertical stabilizers (5), each of the booms with vertical stabilizers is equipped with an adapter (6), and the wing panels (3) are configured so that the adapters of the boom with vertical stabilizer (6) are connectable thereto to form a lock connection.

Figure 3:
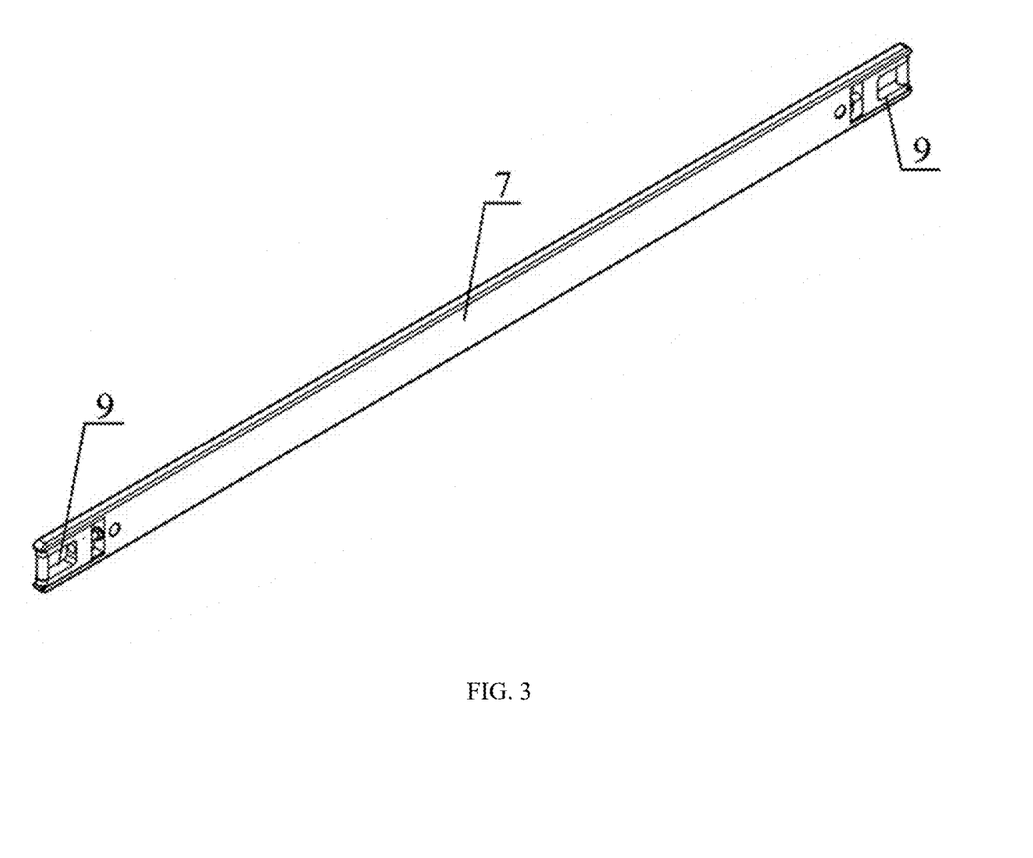
FIG. 3 illustrates the spar with the adapter.

A spar (7) is passed through the fuselage (2), and the wing panels (3) are provided with spar holders (8), while each end of the spar (7) is equipped with adapters (9) made as tabs.

Figure 6:
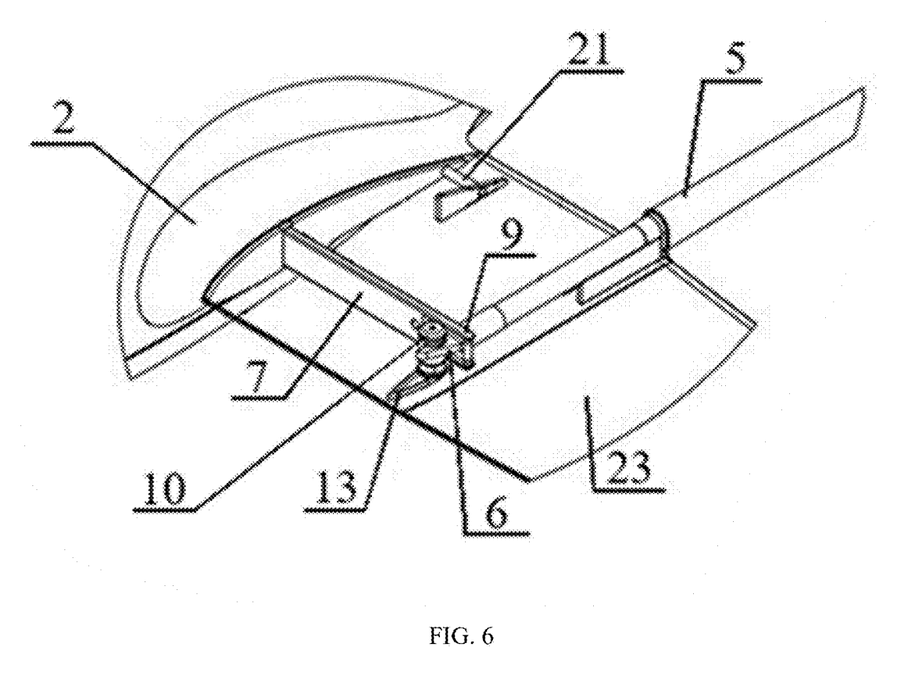
FIG. 6 illustrates the lock connection of the turn bushing to the spar adapter and to the adapter of the boom with vertical stabilizer.

The lock connection is formed by a simultaneous connection of a turn bushing (10) having a transverse notch (11) and a spring-loaded fastener (12), the bushing is positioned in each of the wing panels (3), to the spar adapter (9) and to the adapter of the boom with vertical stabilizer (6) that is hook-shaped, while being fixable by an external lever (13) that is rigidly coupled to the turn bushing (10).

Figure 4:
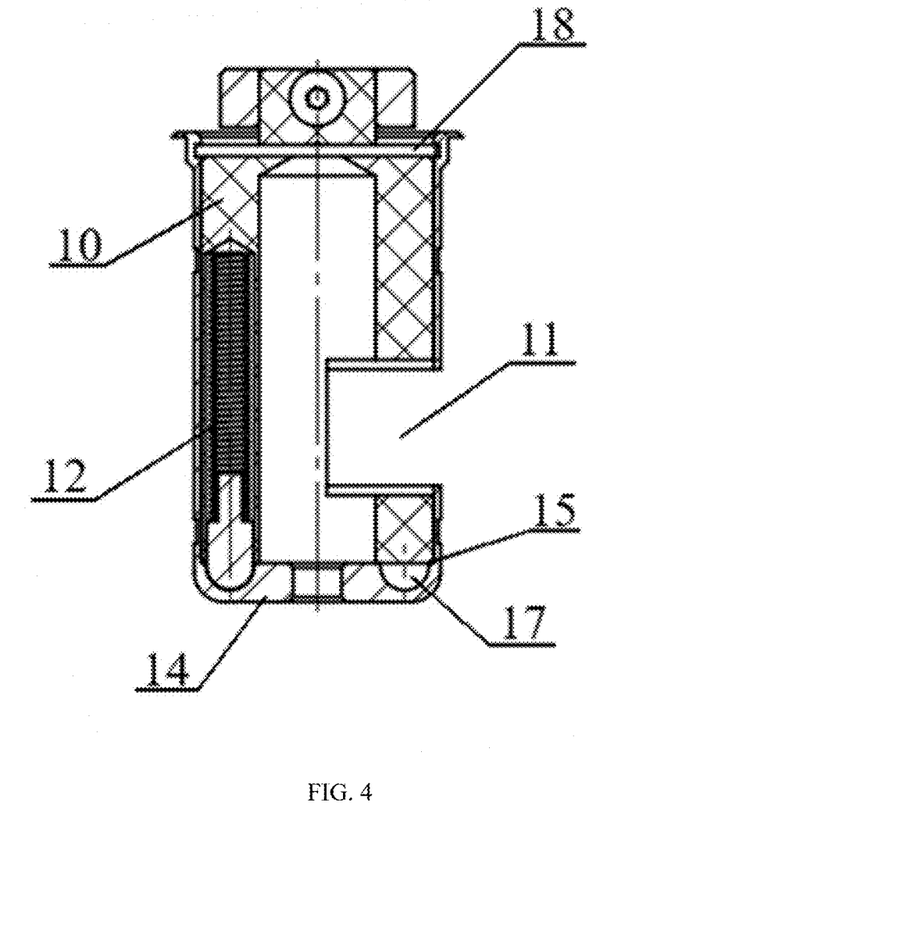
FIG. 4 illustrates a cross-section of the turn bushing with the spring-loaded fastener in an open position.
Figure 5:
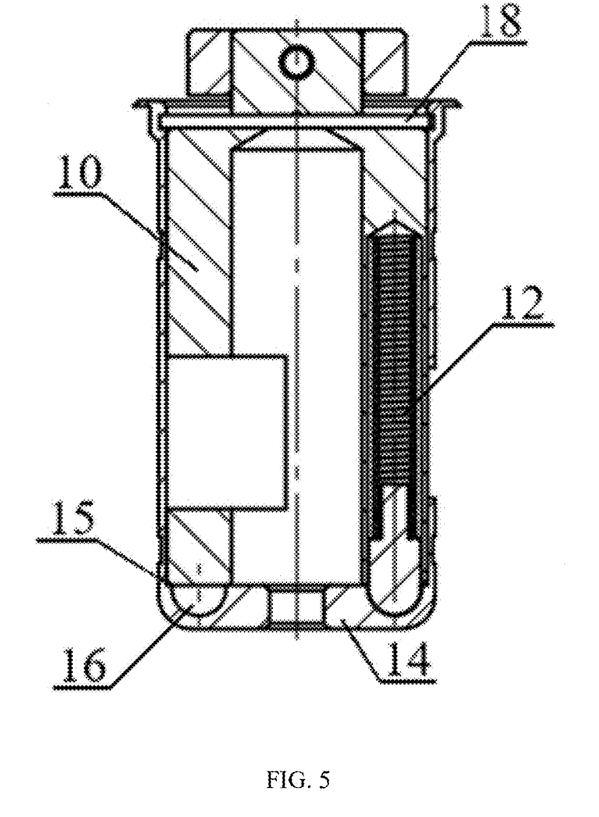
FIG. 5 illustrates a cross-section of the turn bushing with the spring-loaded fastener in a closed position.

The configuration of the lock connection as described in the claims may be implemented, e.g., by means of a shell (14) that is positioned in the wing panel (3) with the turn bushing (10) mounted in the shell. A spring-loaded fastener (12) is mounted in the turn bushing (10). The turn bushing (10) is mounted in the shell (14) such that the spring-loaded fastener (12) is received in a guide groove (15) of the shell (14). Therewith, the guide groove (15) is arc-shaped and comprises a first recess (16) of the guide groove and a second recess (17) of the guide groove. The first recess (16) of the guide groove fixes a first open position of the lock connection, while the second recess (17) of the guide groove fixes a closed position. Fixation of the turn bushing (10) in the shell (14) against any axial displacement is ensured by a retaining ring (18). An external lever (13) is mounted on an output end of the turn bushing (10), the lever is fastened, e.g., by a screw or another fastening element known from the prior art.

An operation principle of the lock connection lies in that the spar (7) is moved along a fuselage holder (19) followed by movement along the holder (8) that is positioned in the wing panel (3), while the boom with vertical stabilizer (5) is moved along a holder (20) of the boom with vertical stabilizer such that the adapter of the boom with vertical stabilizer (6) passes through the spar adapter (9) and enters the transverse notch (11) of the turn bushing (10). At the same time, it is required that the external lever (13) is in its open position.

In order to fasten the boom with vertical stabilizer (5) and the spar (7), one rotates the external lever (13) by 180 degrees. During rotation of the external lever (13), the spring-loaded fastener (12) moves along the guide groove (15) and in its end position, due to generated spring load, the spring-loaded fastener (12) is pressed, moves from the first recess (16) of the guide groove as illustrated in FIG. 4 and enters the second recess (17) of the guide groove as illustrated in FIG. 5. This ensures reliable fastening in the closed position.

Opening of this mechanism is performed in a reversed order by rotating the corresponding external lever (13). Each wing panel (3) is equipped with one torque pin (21) that enters a fuselage hole (22) that is displaced along an axis of the fuselage (2) relative to the spar (7).

According to an exemplary embodiment, the spar (7) is made as a bar that has a flat shape and movable and fixable by rotation around the symmetry axis in the fuselage holder (19). Therewith, the wing panels (3) comprise the holders (8) for the passage of the spar (7), which ensure precise and reliable connection of the wing panels (3) to the spar (7). The fuselage holder (19) and the holders (8) can be made as flat tubes having a cross-section that coincides with a cross-section of the spar (7). This configuration ensures rigid fastening of the spar (7) in the fuselage (2) and the wing panels (3), thereby avoiding any vertical displacement of the spar (7). This ensures high structural stability and reliability during use of the UAV (1), while minimizing risks of deformation or losses of the structural integrity.

The lock connection is arranged in the wing panel internal part (23), thereby ensuring a reliable connection of the elements of the structure, increasing an overall rigidity and stability of the UAV (1) during flight.

The external lever (13) is positioned on the wing panel lower surface (24). The lock connection is opened and closed by rotation of the external lever (13). Therewith, a rotation angle of the external lever (13) in the open position is 0 degrees, while during rotation thereof, it is 180 degrees. Owing to this fact, there is no need to use any tools to assemble and disassemble the UAV (1). The external lever (13) may be made as a flat plate that is narrowed towards one end to provide a convenient manual engagement and, thus, to perform easy rotation.

Figure 2:
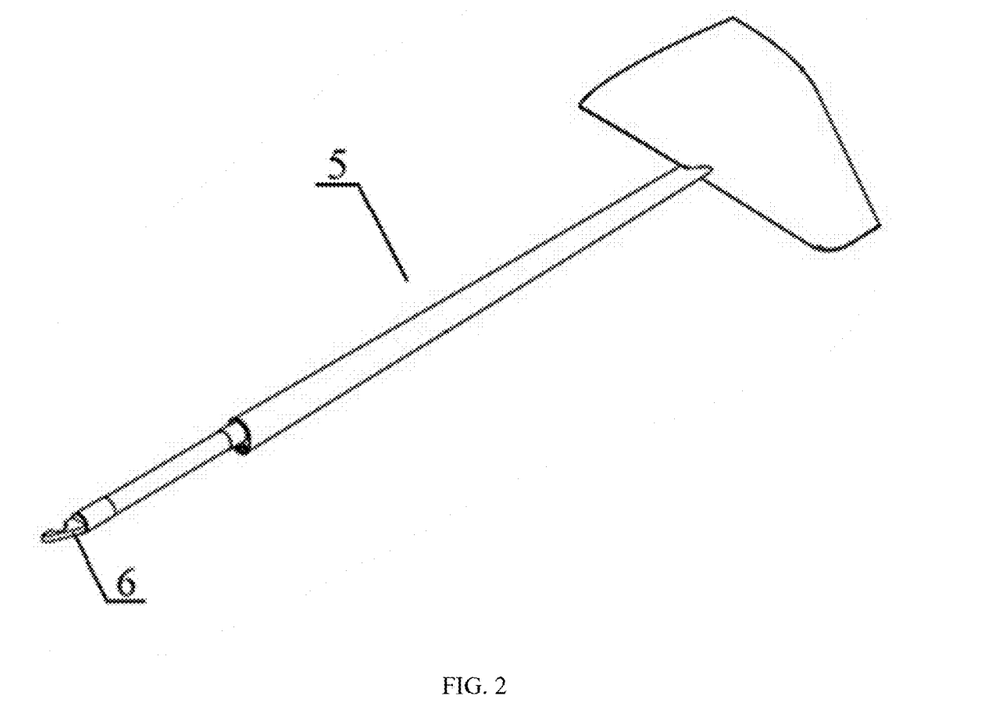
FIG. 2 illustrates the booms with vertical stabilizers with the adapter.

The two booms with vertical stabilizers (5) are connected to the horizontal stabilizer (4) using torque pins (25) of the stabilizer. The stabilizer (4) can be made as a flat structure. The fastening of the stabilizer (4) with the two booms with vertical stabilizers (5) may be ensured, e.g., by means of the two torque pins (25) of the stabilizer that are arranged on each stabilizer (4) tips one by one. In a specific exemplary embodiment, two torque pins (25) of the stabilizer are arranged on each of the stabilizer (4) tips. Thus, each boom with vertical stabilizer (5) comprises slots (26) for insertion the torque pins (25) of the stabilizer.

In order to increase the overall structural rigidity and reliability, all the elements, including the spar (7) and the booms with vertical stabilizers (5), may be made of lightweight and rigid materials such as carbon-fiber composite or aluminum alloys.

Figure 7:
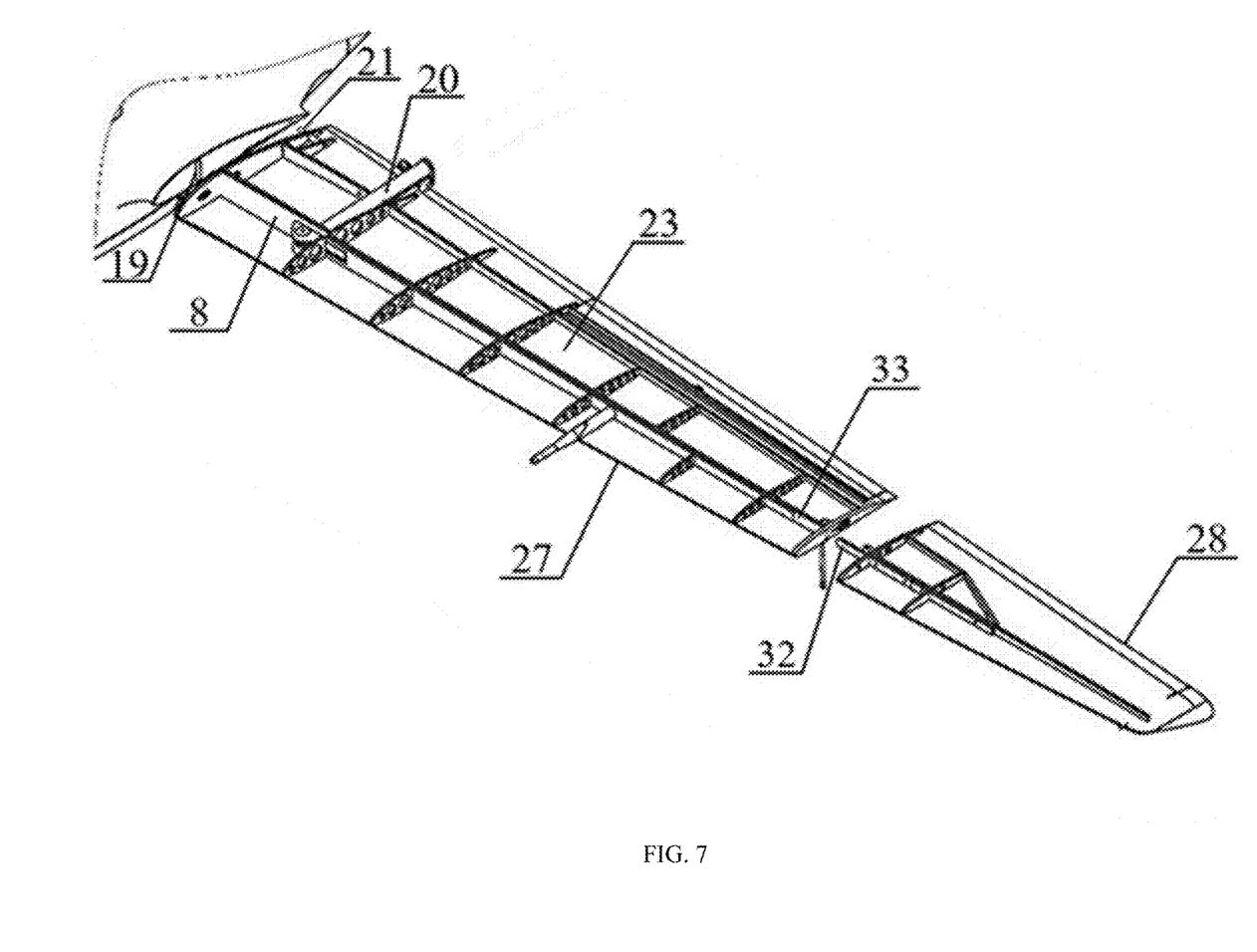
FIG. 7 illustrates the wing panels main part with the end part.
Figure 8:
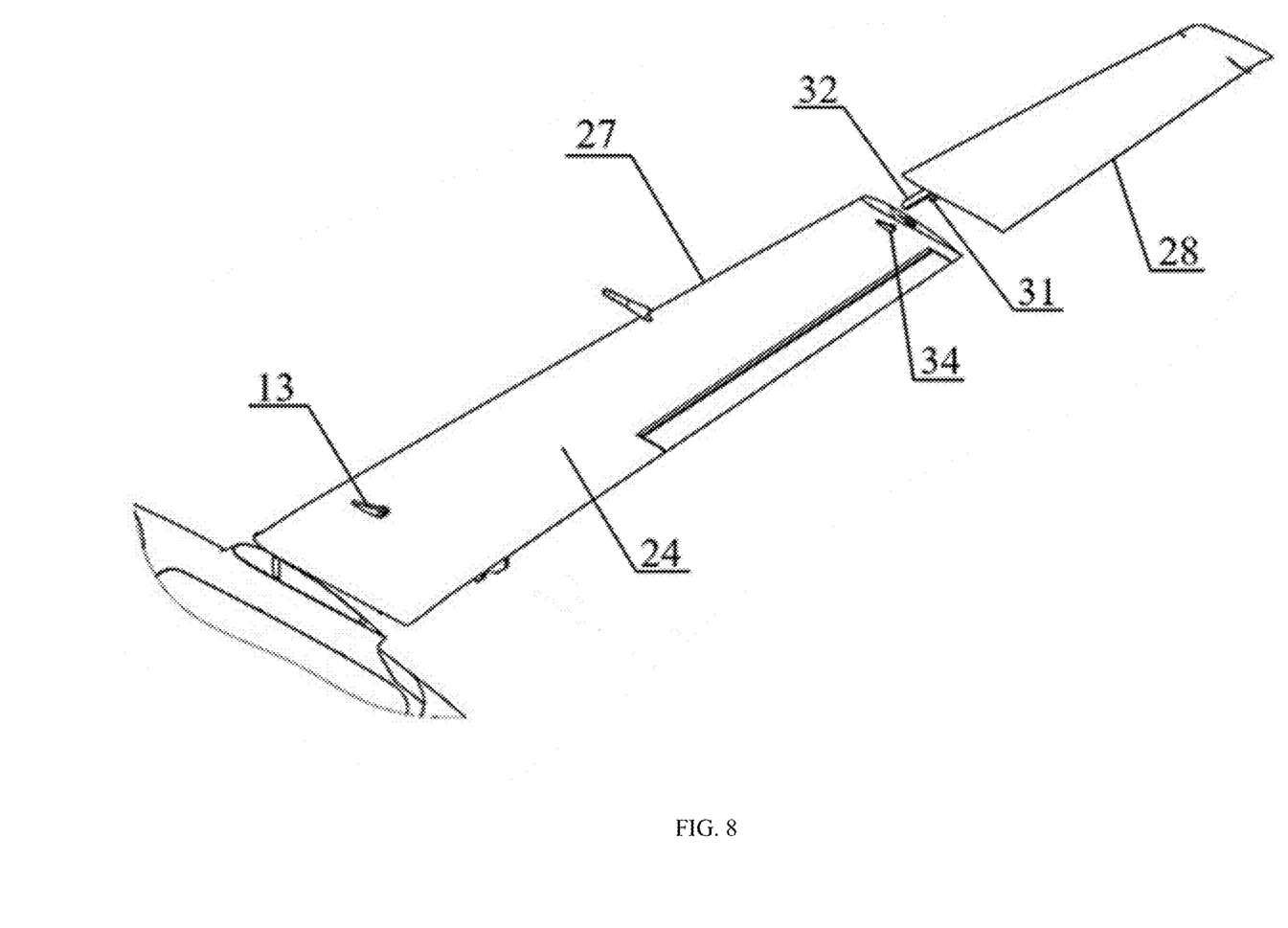
FIG. 8 illustrates a bottom view of the wing panel main part with the end part.

Each wing panel (3) comprises a wing panel main part (27) and a wing panel end part (28). The wing panel end part (28) is equipped with an adapter (31) of the wing panel end part. The wing panel main part (27) is coupled to the wing panel end part (28) by means of the lock connection.

The wing panel end part (28) may have various shapes and lengths depending on specific tasks and use conditions. A change of the wing panel (3) length allows to ensure a higher lifting force, as well as to enhance aerodynamic characteristics, thereby allowing the UAV (1) to fly for greater distances and to reduce fuel consumption.

Figure 9:
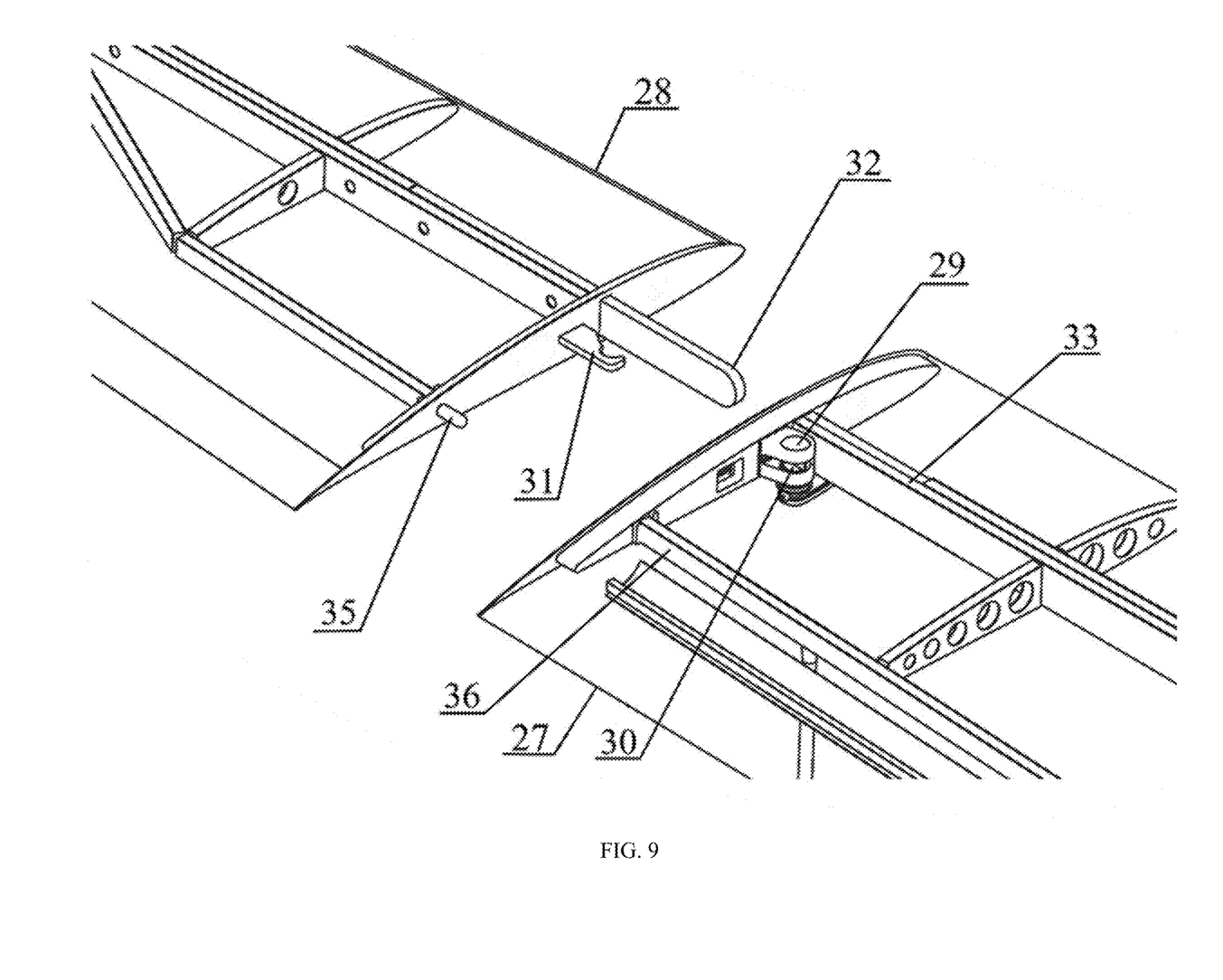
FIG. 9 illustrates the lock connection of the wing panel main part with the end part.

The configuration of the lock connection of the wing panel main part (27) and the wing panel end part (28) as described in the claims may be implemented, e.g., by means of a spring-loaded turn bushing (29) having a transverse notch (30), and the bushing is coupled to the adapter (31) of the wing panel end part, the adapter is made as a hook. Also, the wing panel end part (28) may further comprise a plug (32).

An operation principle of the lock connection of the wing panel main part (27) to the wing panel end part (28) is that the wing panel end part (28) is connected to the wing panel main part (27) such that the adapter (31) of the wing panel end part is received in the transverse notch (30) of the spring-loaded turn bushing (29), while the plug (32) is received in a holder (33) of the wing panel main part. At the same time, it is required that an external lever (34) is in its open position. In order to fasten the wing panel end part (28), one rotates the external lever (34) by 180 degrees.

Each wing panel end part (28) may further comprise one torque pin (35) of the end part that enters a holder (36) of the wing panel main part, the holder is reduced along an axis of the wing panel main part (27) relative to the adapter (31) of the wing panel end part.

Opening of this mechanism is performed in a reversed order by rotating the corresponding external lever (34).

The subject invention allows to provide the modular UAV that is easily transportable, quick and simple to assemble and disassemble at a mission accomplishment, take-off or landing site, while preserving high aerodynamic performance characteristics.

The invention claimed is:

1. A modular unmanned aerial vehicle (UAV), comprising: a fuselage, wing panels, a stabilizer, and two booms with vertical stabilizers, each of the booms with vertical stabilizers is equipped with an adapter, and the wing panels are configured so that the adapters of the booms with vertical stabilizers are connectable thereto to form a lock connection, wherein a spar is passed through the fuselage, and the wing panels are provided with holders for the spar, while each end of the spar is equipped with adapters made as tabs, and the lock connection is formed by a simultaneous connection of a turn bushing having a transverse notch and a spring-loaded fastener, the bushing is positioned in each of the wing panels, to the spar adapter and to the adapter of the boom with vertical stabilizer that is hook-shaped, while being fixable by an external lever that is rigidly coupled to the turn bushing, and each wing panel is equipped with at least one torque pin that is coupled to a corresponding hole in the fuselage that is displaced along a fuselage axis relative to the spar.

2. The modular UAV according to claim 1, wherein each wing panel comprises a main part and an end part that is equipped with an adapter, and the wing panel main part is coupled to the wing panel end part by means of the lock connection that is formed by a simultaneous connection of the spring-loaded turn bushing having the transverse notch to the adapter of wing panel end part.

3. The modular UAV according to claim 1, wherein a turning angle of the external lever is from 0 to 180 degrees.

4. The modular UAV according to claim 1, wherein the spar is made as a bar that is movable and fixable as a result of a turn around a symmetry axis within a fuselage holder.

5. The modular UAV according to claim 1, wherein the holders of the booms with vertical stabilizers are provided in the wing panels.

6. The modular UAV according to claim 1, wherein the lock connection is arranged in an internal part of each wing panel.

7. The modular UAV according to claim 1, wherein the two booms with vertical stabilizers are connected to the stabilizer by the stabilizer torque pins.

\* \* \* \* \*